Nov. 3, 1964           A. J. HILGERT           3,155,104
                ELECTRIC-PRESSURE TRANSDUCERS
Filed March 23, 1962                          4 Sheets-Sheet 1
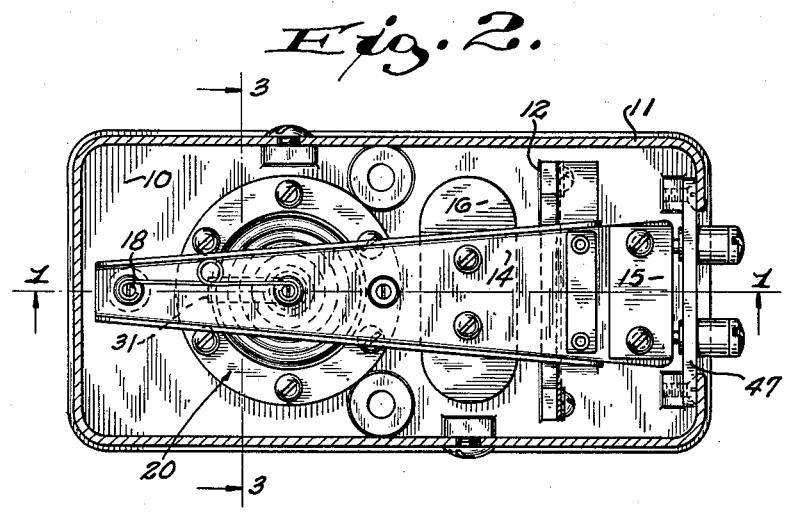
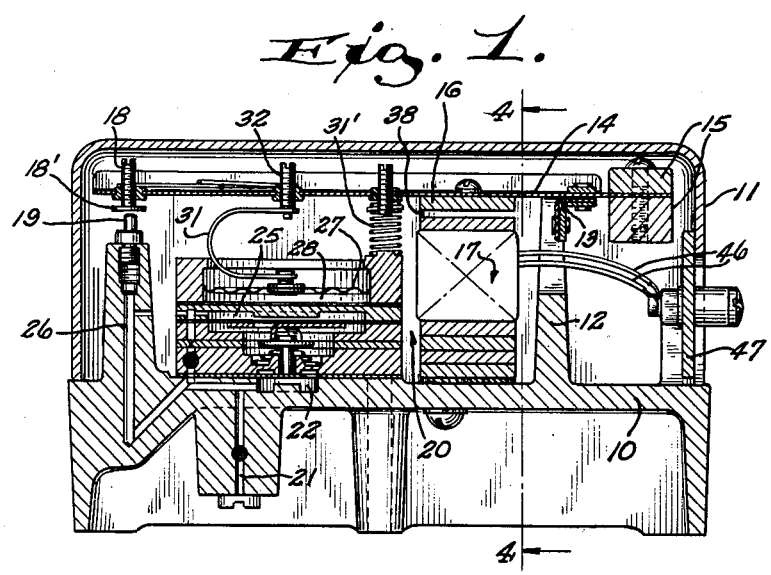
INVENTOR.
ADOLPH J. HILGERT
BY
ATTORNEYS

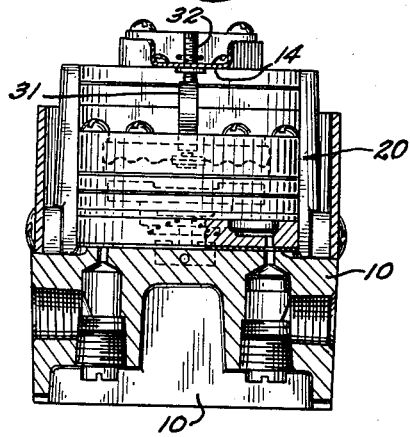
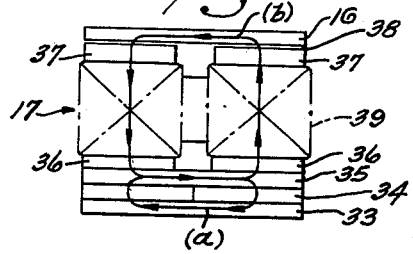
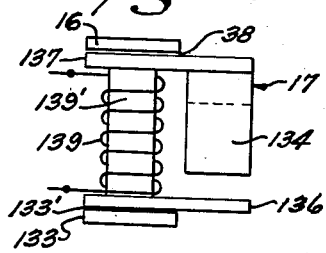
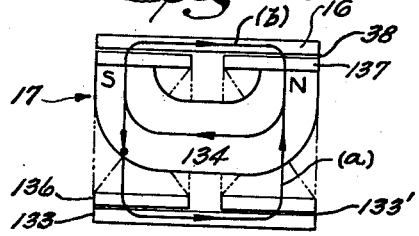

Nov. 3, 1964 A. J. HILGERT 3,155,104
ELECTRIC-PRESSURE TRANSDUCERS
Filed March 23, 1962 4 Sheets-Sheet 3

INVENTOR.
ADOLPH J. HILGERT
BY
ATTORNEYS.

Nov. 3, 1964

A. J. HILGERT 3,155,104

ELECTRIC-PRESSURE TRANSDUCERS

Filed March 23, 1962

INVENTOR.
ADOLPH J. HILGERT
BY
ATTORNEYS.

United States Patent Office 3,155,104
Patented Nov. 3, 1964

3,155,104
ELECTRIC-PRESSURE TRANSDUCERS
Adolph J. Hilgert, Milwaukee, Wis., assignor to Johnson Service Company, Milwaukee, Wis., a corporation of Wisconsin
Filed Mar. 23, 1962, Ser. No. 182,064
6 Claims. (Cl. 137—85)

This invention relates to improvements in electric-pressure transducers.

There are many applications in heating, ventilating, air conditioning, or other fields where it is desirable to have a pneumatic output pressure which is proportional to an electrical input signal. It is particularly desirable to have an electric thermostat which is highly sensitive and which is capable of providing a rapid response to minute temperature changes. Such a device may be used for ultimate operation of proportional pneumatic valves, damper operators, or the like, in heating, ventilating, and air conditioning systems.

Heretofore, electric-pneumatic transducers have been proposed where the power unit comprised a coil supported in a magnetic field of a permanent magnet, direct current from a controller flowing through the coil and creating a force to move the coil through the magnetic field. In these conventional designs longer coils, or a stronger permanent magnetic field from a larger permanent magnet could produce a stronger force from a given input signal. Within reasonable size limitations this prior type of power unit does not have the required sensitivity to operate directly from a weak signal produced by a thermostat as mentioned previously.

A more efficient type of device known as a torque motor would have greater sensitivity and be able to operate from a much weaker signal. The ultimate force output of torque motors is limited only by the saturation of the magnetic circuit or parts thereof.

A general object of the present invention is to keep the physical dimensions of the power unit small while maintaining a high ratio of force output to electrical input.

A further object of the present invention is to provide a device of the class described having an electromagnetic power unit wherein there is a minimum length of air gap between armature and pole faces; a maximum number of turns for the allowable coil resistances; and a pole face area larger than core area.

A further object of the present invention is to keep the length of the magnetic circuit as short as possible to minimize hysteresis and still maintain a high ratio of number of turns to coil resistance.

A further object of the present invention is to provide a device which may, if desired, be responsive to a multiplicity of input signals to integrate said signals in various manners.

It is a further general object of the present invention to provide an improved electric-pressure transducer which is more efficient and more sensitive than devices heretofore used, the present device having a high efficiency in converting electrical energy into a force. Thus, very low power signals with no further amplification may be used to operate the transducer. For example, the signal may be produced by a photo-electric cell responsive to outdoor brightness to control the light intensity in a school. It is possible to operate the present transducer with an input measured in microwatts only.

A further object of the invention is to provide an improved transducer which has high sensitivity coupled with good linearity.

A further object of the invention is to provide an improved transducer embodying a relatively simple design of power unit which power unit is, nevertheless, highly sensitive and efficient, and capable of allowing wide impedance variations, the unit being of such construction that it is easy to produce and easy to maintain a small air gap between the armature and the pole faces.

A further object of this invention is to provide an improved transducer embodying a novel power unit having a unique means of polarization by which the force output is proportional to the square of the ampere turns as compared to the first power in a power unit of conventional design.

A further object is to provide an improved transducer of the type having a feed back diaphragm, wherein the action is stabilized by novel means including the use of a variable rate spring which is independent of said feed back diaphragm and which is used in addition to a spring for the feed back diaphragm and is so positioned and arranged with respect to the latter and the rest of the structure that maximum sensitivity with stability is achieved.

With the above and other objects in view, the invention consists of the improved electric-pressure transducer, and all of its parts and combinations, as set forth in the claims, and all equivalents thereof.

In the accompanying drawings, illustrating several embodiments of the preferred form of the invention, in which the same reference numerals designate the same parts in all the views:

FIG. 1 is a vertical longitudinal section through one form of the improved device taken on the line 1—1 of FIG. 2;

FIG. 2 is a top plan view of the device of FIG. 1 with the top of the casing broken away;

FIG. 3 is a sectional view taken on the line 3—3 of FIG. 2;

FIG. 4 is a sectional view, partially diagrammatic, taken approximately along the line 4—4 of FIG. 1 showing one form of power unit;

FIG. 5 is a view similar to FIG. 4 showing another form of power unit;

FIG. 6 is an end view of the power unit of FIG. 5;

Figure 8:
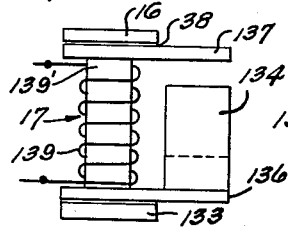
FIG. 8 is an end view of the power unit of FIG. 7.

Referring more particularly to the drawings, the numeral 10 designates a base on which the mechanism is mounted, said base being fitted with a removable cover 11. Within the cover the base has an upstanding support 12 for flexure hinges 13 on which a transfer lever 14 is mounted for minor hinging movement, one projecting end of the lever being counterweighted as at 15. On the opposite side of the hinges from the counterweights, an armature 16 is supported on the underside of the lever in a position for cooperation with a power unit 17, which unit will be hereinafter described in greater detail.

The transfer lever carries near its left hand end, by means of a lid adjusting screw 18, a lid 18', for control of a leakport 19. The screw 18 has threaded connection with the lever and provides for a range adjustment.

Figure 10:
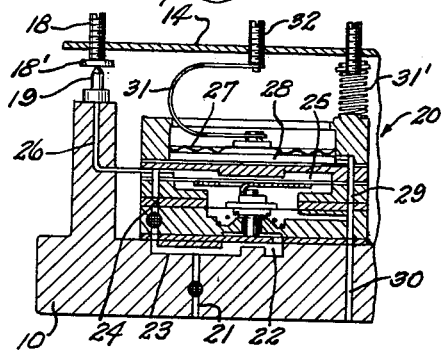
FIG. 10 is a partially diagrammatic view of the relay and feedback portion of the device.

Mounted between the power unit and the leakport is a pneumatic relay 20. The portion of this relay is shown more clearly in the partially diagrammatic view of FIG. 10. It is generally similar to the relay shown and described in pending application of Thomas M. Holloway, Serial No. 150,356, filed November 6, 1961. It includes an air supply inlet conduit 21 leading to a recess 22 forming a supply pressure chamber. Supply air also flows through a lateral conduit 23 past a restrictor 24, where it acts in a diaphragm chamber 25. A duct 26 provides communication between the diaphragm chamber 25 and the leakport 19. The device also includes a feedback diaphragm 27 over a chamber 28, which chamber is in communication with output pressure through the line 29, said output pressure being led out through the branch 30 where it may be used to operate a pneumatic valve, pneumatic damper, or other pneumatic devices.

The arrangement is such, as fully described in the copending Holloway application Serial No. 150,356, that when the leakport 19 is gradually closed by the lid 18', which is moved by the transfer lever 14, a smaller quantity of air escapes from the supply pressure chamber 22 and the pressure in this chamber rises. Through the arrangement of diaphragms within the relay, increases in pilot pressure in the chamber 25 cause the output pressure through line 30 to be proportionately increased. When the leakport lid 18' moves away from the leakport 19 the pressure in the chamber 25 is reduced, and there is a proportionate reduction in the output pressure from the relay. Inasmuch as the output pressure is communicated through line 29 with the feedback diaphragm chamber 28 these pressure changes act upon the feedback diaphragm 27. In the form of invention of FIG. 1 the latter is connected by a bimetallic U-spring 31 with the lower end of a set point adjustment screw 32 which is threaded in the transfer lever as shown in FIG. 1. The spring 31 has its high expansion side on the outer side of the U. There is also a spring 31'. Thus, changes in pressure are fed back to the transfer lever through the spring 31. The springs 31 and 31' match the output of the power unit to the feedback and result in stable operation.

In the actual transducer there is always a small movement of the armature as arm 14 moves towards leakport 19. In order to obtain maximum sensitivity, the initial armature air gap should be a minimum (between .002 and .015) so that the force increase will be along the CB portion of curve ACB of FIG. 13. Whenever a transducer is operating in the AC portion of ACB, it has low sensitivity; furthermore, if the *slope* of the curve is greater than the *slope* of XX' then a transducer will be unstable.

To make this point clearer assume that springs 31 and 31' were not present. An input signal into the transducer coils would cause the armature to move towards a smaller air gap and lid 18' towards leakport 19. Once the air gap begins to get shorter, the force on the armature increases at a rate determined by curve ACB, FIG. 13. This occurs even though the signal is not increased. The motion of the armature once started would continue until lid 18' contacts leakport 19. This action is known as regenerative feedback and would result in two position (i.e., "on"-"off") action of the transducer.

Figure 13:
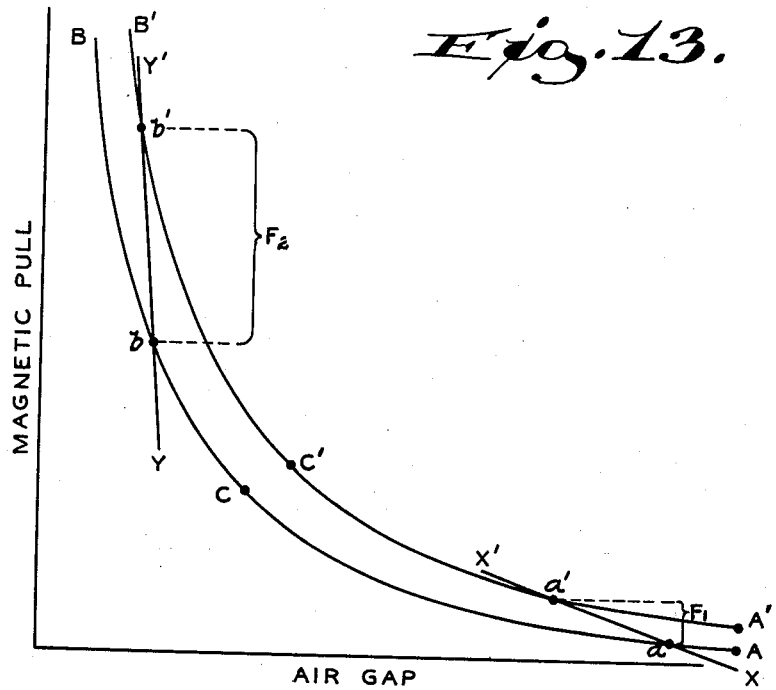
FIG. 13 represents the pull curve for the power unit, the reference characters ACB representing the force output if the armature is allowed to move toward the pole faces.

With the present invention by adding spring 31 such that its rate, given by line XX' in FIG. 13, is higher than the slope of ACB at ($a$), stable operation will result since the spring force will always be able to balance out any increased magnetic pull on the armature.

However, in portion CB of curve ACB the slope of XX' (FIG. 13) is not great enough. To obtain the advantage of greater force change and, therefore, greater sensitivity, it is a feature of novelty of the present invention to also add spring 31', such that the combined rates of springs 31 and 31', represented by line yy' in FIG. 13, is greater than that of curve CB at ($b$). This results in stable operation in this region.

To show increased sensitivity with the smaller air gap, curve A'C'B' represents the force output at some increased input signal. $F_1$ and $F_2$ represent the relative changes in force outputs for a large and small air gap respectively.

To obtain a transducer signal output corresponding to curve A'C'B', the line yy' must cross this curve at same point b'. The same holds true for line XX' and point a' if no spring 31' is used in a transducer.

Figure 14:
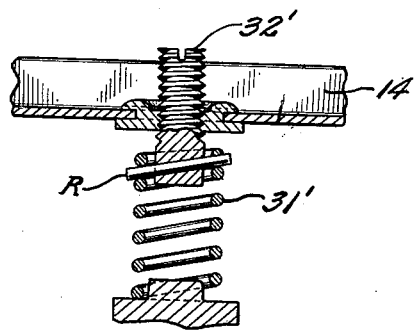
FIG. 14 is a fragmentary detail view showing a preferred form of variable rate spring.

Since the slope of the curve changes over its whole length, the rate of spring 31' has been made adjustable as shown in FIG. 14 so that the optimum rate can be chosen. FIG. 14 illustrates one preferred form of variable rate spring. By turning adjusting screw 32' whose thread pitch is approximately the same as that of spring 31', pin R will move in such a manner as to engage a greater or lesser number of turns of springs 31' thus changing the effective rate. Pin R is set into the end of screw 32' at an angle so that it engages opposite sides of the spring simultaneously.

The several alternative power units are of special design to obtain the high degree of linearity coupled with high sensitivity which is needed when it is desired to convert very low power signals into forces capable of accomplishing the work of opening and closing valves and dampers. Heretofore, some power units have comprised a conventional permanent magnet with a coil mounted to move in the magnetic field. This prior design has a high degree of linearity but has little efficiency in converting electric energy into force. As a result, it must be made relatively large to accomplish any work or some intermediate stage of amplification between the signal and transducer must be used. The several alternative designs of the present invention are capable of being used in compact instruments and have very high efficiency for their size in converting electrical energy into force.

Referring now to FIG. 4, showing one type of power unit, there is a flux return base 33, ceramic permanent magnets 34, a magnetic shunt 35, and core assemblies having pole face enlargements 36 and 37, there being an air gap 38 between the upper pole face enlargements and the armature 16. The cores are wound with the coils 39 which coils have current supply wires 46 leading to a terminal board 47 at one end of the cover as shown in FIG. 1.

With the arrangement of FIG. 4 most of the flux ($a$) from the permanent magnets 34 goes through the shunt 35, partially saturating it. This in turn causes some of the flux to go through the air gap 38 as indicated at ($b$), which gap is actually between .002 and .015" but which, for purposes of clarity, appears larger in some of the figures. The hysteresis is kept to a minmum by the use of low hysteresis core material such as Carpenter "Hymu 80" or Allegheny "Mumetal."

A still more efficient design with still greater sensitivity is showgn in FIG. 5 where there is another variation of a polarized power unit which may be used in FIG. 1 instead of the unit of FIG. 4. This design includes a base 133, supporting cores having pole face enlargements 136 and 137, the cores being wound with the coils 139, which coils may be connected to the supply wires of FIG. 1. The base 133 is separated from the core ends by a nonmagnetic gap 133' approximately equivalent to the gap 38. The purpose of this gap is to make the reluctance of path ($a$) and path ($b$) approximately equal. Located near the air gap 38 is a polarizing or biasing permanent magnet 134. This produces a magnetic flux distribution as shown at ($b$) in FIG. 5, this being an initial flux which is present without any signal occurring. By making the pole face area relatively large and the length of air gaps short, the reluctance of magnetic circuit can be kept low. This reduces the ampere turns required to produce a given change of flux in air gap.

A further advantage of the power unit of FIG. 5 is that if the current in the coils is such that the flux ($b$) in the air gap is increased, the flux ($a$) in the core is decreased by approximately the same amount. This means that the cores may be made smaller, making more space available for the coils. The polarization illustrated in FIG. 5 increases the sensitivity of the electromagnet. Furthermore, the greater amount of initial flux ($b$) produces a more sensitive device.

In FIG. 5 the additional flux from the NI (ampere-turns) of coils 139 is in such a direction as to add to the flux in path ($b$), the flux in path ($a$) being reduced by substantially the same amount. This is why the core 139' can be kept to a minimum diameter whereby the maximum number of coil turns can be wound thereon. Similar reasoning applies to the alternative form of power units shown in FIGS. 7 and 8 where the same reference numerals are used, the only difference in the construction over that of FIG. 5 being that the polarizing magnet 134 is mounted on the lower pole face enlargement instead of on the upper, the input signal only subtracting from the flux in path ($b$).

Figure 11:
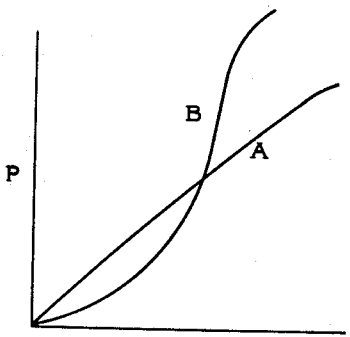
FIG. 11 is a diagram showing characteristics of the device.

For comparison, curve A of FIG. 11 shows the output of a conventional torque motor or power unit which has a force output that is proportional to the NI (ampere-turns) input. It is seen that for low NI input the force increase for a conventional torque motor is greater than for the operator of the type shown in FIG. 5 but with no permanent magnets. By adding magnet 134 a flux is produced in the structure such that $\phi_a + \phi_s = \phi_t$ where $\phi_a$ is the flux through the useful air gap 38 of length $L_1$, $\phi_s$ is the flux through the cores 139' and base 133, and $\phi_t$ is the total flux through the magnet. $L_2$ is the length of the non-magnetic gap 133' between the core and base 133. This gap produces enough reluctance between core 139' and base 133 as to divert sufficient flux through air gap 38. If air gap 133' were zero length, most of the flux would be short circuited through base 133 and very little would go through air gap 38.

Any flux in air gap 38 produces a pull somewhere on curve B of FIG. 11. It is seen that if this flux is high enough, the increase in pull becomes greater than for curve A. Any additional flux produced by coils 139 may either add to or subtract from the flux in air gap 38 depending on the current direction in coils 139. The important point is that the change in force can be made considerably greater for curve B than for curve A.

Figure 12:
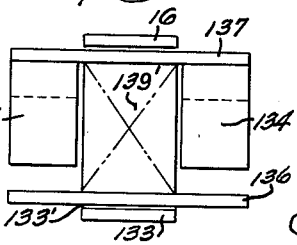
FIG. 12 is a modification of the power unit of FIG. 5.

In order to get additional flux into the circuit, the design of FIG. 12 using two permanent magnets can be used. The maximum slope for curve B is reached when the metal parts carrying flux in any part of the magnetic circuit begin to saturate. In FIG. 12 the same reference numerals designate the same parts as in FIG. 6.

Figure 9:
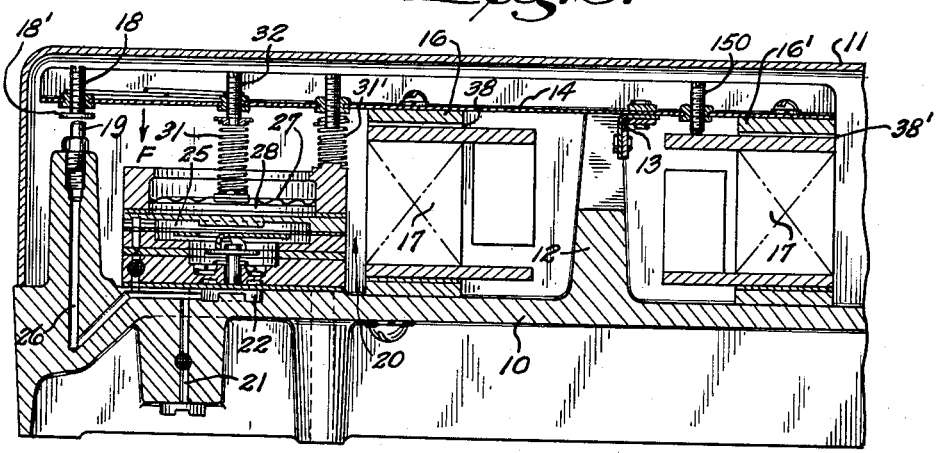
FIG. 9 is a fragmentary vertical longitudinal sectional view through another form of electric-pressure transducer showing the use of both power units of FIGS. 6 and 8 in a single device.

If a power unit of the type shown in FIG. 6 is made to cooperate with one of the type shown in FIG. 8, as is shown in the transducer of FIG. 9, then the force F shown by the arrow in FIG. 9, which force is produced by the input signal, can always be made to act in the direction shown by the arrow. Furthermore, the input force relation can be made quite linear since the two non-linearities of the two power units of FIG. 9 tend to cancel each other out.

Figure 7:
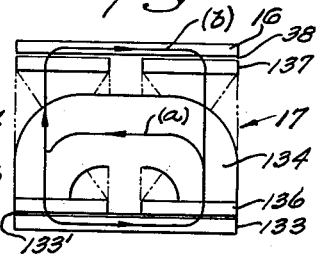
FIG. 7 is a view similar to FIGS. 4 and 5 showing still another form of power unit.

Referring more particularly to FIG. 9, the construction is the same as illustrated and described in connection with FIG. 1, except that, in lieu of the power unit 17 of FIG 1, a power unit of the type shown in FIGS. 5 and 6 has been substituted, the same reference numerals being used on this power unit as are used in FIGS. 5 and 6. Also, in lieu of the counterweights 15 on the other side of the flexure hinge 13 of FIG. 1, another power unit of the type shown in FIGS. 7 and 8 is employed with the same reference numerals and there is an additional armature 16'. Adjustment screw 150 on the transfer lever acts as a stop to prevent armature 16 from closing completely against the upper pole face, which might cause locking of the armature and power unit together. The rest of the structure of FIG. 9 is the same as the structure of FIG. 1 (except that the spring 31 is a helical spring rather than a U-spring as in FIG. 1) and the same reference numerals have been utilized as in FIG. 1. This particular power unit with four coils and with the pivot in the center between the two sets makes it possible to have the device responsive to one, two, three, or four input signals. Where there are four input signals each one may have a separate coil and the several signals may be integrated in various manners. The coils may be connected in series or parallel, or in combinations thereof, and operated by one or more signals in accordance with requirements.

*Operation*

In operation, an electric signal into the coils 39 or 139 produces a pull on the armature 16 which tends to move the transfer lever 14 downwardly. This motion tends to close the leakport 19 which, in turn, increases the output pressure at 30 and 29 of the pneumatic relay 20. The pressure in the line 29 acts on the feedback diaphragm 27, and the motion of the latter is transmitted through the feedback spring 31 to the transfer lever 14 and balances out the increased pull on the armature. The feedback spring 31 together with the spring 31' matches the force from the feedback diaphragm 27 to the magnetic pull of the armature.

The sensitivity may be changed by turning the lid screw 18. This in turn varies the length of the air gap 38. The output pressure for zero current is determined by the set point adjusting screw 32. The transducer operates on D.C. current only. The resistance of the power unit coils 39 or 139 may have a wide range of values from less than 1 ohm to 12,000 ohms to match the impedance of the input signal. In the form of FIG. 1 the counterweights 15 make the output at 30 independent of the position of the instrument. As before mentioned, the pneumatic output at 30 may be used to operate many pneumatic devices, such as a valve for heating or cooling, a mixing valve for heating, or a damper operator.

Various changes and modifications may be made without departing from the spirit of the invention, and all of such changes are contemplated as may come within the scope of the claims.

What I claim is:

1. In a fluid pressure device of the type having a conduit with an inlet portion connectible to a source of fluid under pressure and with an outlet portion, and having means including a leakport for regulating the output pressure in said outlet portion, said device also being of the type having a transfer lever and with a leakport lid carried by said transfer lever in a position to cooperate with said leakport, and said device being of the type having electromagnetic means positioned to coact with said transfer lever to move the latter in a gap-reducing direction with respect to the leakport, and said device being of the type having feedback means responsive to output pressure in said outlet portion for moving said transfer lever reversely to its first direction of movement, whereby small electrical power to the signal coils may be converted into a relatively high output pressure which is proportional to said electrical input in the signal coil, the improvement comprising: providing an electromagnetic means which includes a fixed core and fixed coil and a movable armature with the latter spaced by a small, variable, air gap from the end of the core, a feedback spring included in said feedback means, and a stabilizing spring acting independently of said feedback spring and positioned between the frame and transfer lever, the sum of the rates of said feedback spring and stabilizing spring being greater than the rate of increase of the magnetic pull on the movable armature resulting from the change in the length of the air gap between the armature and the core, which magnetic pull moves the transfer lever in a gap-closing direction with respect to the leakport, whereby maximum sensitivity with stability results.

2. A device in accordance with claim 1 wherein there is means for adjusting the rate of said stabilizing spring.

3. A device in accordance with claim 1 wherein there is means for adjusting the feedback spring and means for adjusting the rate of said stabilizing spring.

4. A device in accordance with claim 1 wherein said stabilizing spring is positioned to act on the transfer lever at a location between the armature and the feedback spring.

5. In an electric-pressure transducer having a transfer lever, having pneumatic means including a leakport responsive to movement of said transfer lever for regulating the output pressure, having electromagnetic means for moving said transfer lever in a gap-closing direction with respect to the leakport, and having pneumatic feedback means responsive to said output pressure for moving said transfer lever reversely to its first direction of movement, the improvement comprising: providing an electromagnetic means which includes a fixed core and a fixed coil and a movable armature with the latter spaced by a small, variable, air gap from the end of the core, a feedback spring included in said feedback means and positioned to urge said transfer lever in said reverse direction, and a stabilizing spring acting independently of said feedback spring, the sum of the rates of said feedback spring and stabilizing spring being greater than the rate of increase of the magnetic pull on the movable armature resulting from the change in the length of the air gap between the armature and the core, which magnetic pull moves the transfer lever in a gap-closing direction with respect to the leakport, whereby maximum sensitivity with stability results.

6. A device in accordance with claim 5 wherein there is means for adjusting said feedback spring and means for adjusting said stabilizing spring.

References Cited in the file of this patent

UNITED STATES PATENTS

| | | |
|---|---|---|
| 2,141,357 | Lansing | Dec. 27, 1938 |
| 2,265,629 | Christiansen | Dec. 9, 1941 |
| 2,927,593 | Hall | Mar. 8, 1960 |
| 3,080,878 | Dustin et al. | Mar. 12, 1963 |